(12) United States Patent
Baur

(10) Patent No.: US 10,864,865 B2
(45) Date of Patent: Dec. 15, 2020

(54) VEHICLE ACCESSORY CONTROL SYSTEM RESPONSIVE TO A PORTABLE GDO MODULE

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 531 days.

(21) Appl. No.: 15/076,917

(22) Filed: Mar. 22, 2016

(65) Prior Publication Data

US 2016/0288647 A1    Oct. 6, 2016

Related U.S. Application Data

(60) Provisional application No. 62/141,607, filed on Apr. 1, 2015.

(51) Int. Cl.
  *B60R 16/023*    (2006.01)
  *B60Q 9/00*    (2006.01)

(52) U.S. Cl.
  CPC .............. *B60R 16/023* (2013.01); *B60Q 9/00* (2013.01); *B60K 2370/55* (2019.05); *B60K 2370/573* (2019.05)

(58) Field of Classification Search
  CPC .... B60R 16/023; B60Q 9/00; B60K 2350/355
  See application file for complete search history.

(56) References Cited

U.S. PATENT DOCUMENTS

| | | | |
|---|---|---|---|
| 5,708,415 A | 1/1998 | Van Lente et al. | |
| 5,798,688 A | 8/1998 | Schofield | |
| 5,854,593 A | 12/1998 | Dykema et al. | |
| 6,091,343 A | 7/2000 | Dykema et al. | |
| 6,172,613 B1 | 1/2001 | DeLine et al. | |
| 6,362,771 B1 | 3/2002 | Schofield et al. | |
| 6,396,408 B2 | 5/2002 | Drummond et al. | |
| 6,428,172 B1 | 8/2002 | Hutzel et al. | |
| 6,902,284 B2 | 6/2005 | Hutzel et al. | |
| 6,998,977 B2 | 2/2006 | Gregori et al. | |
| 7,012,727 B2 | 3/2006 | Hutzel et al. | |
| 7,023,322 B2 | 4/2006 | Baumgardner et al. | |
| 7,293,888 B2 | 11/2007 | Hutzel et al. | |
| 7,324,261 B2 * | 1/2008 | Tonar ...................... | C09K 9/02 359/267 |
| 7,734,392 B2 * | 6/2010 | Schofield .................. | B60R 1/12 701/36 |

(Continued)

FOREIGN PATENT DOCUMENTS

WO    WO2016/044706    3/2016

*Primary Examiner* — Frederick M Brushaber
(74) *Attorney, Agent, or Firm* — Honigman LLP

(57) ABSTRACT

A control system of a vehicle includes a receiver disposed in the vehicle and operable to wirelessly receive signals generated by a portable garage door opening module when the portable garage door opening module is actuated. The portable garage door opening module includes a separate, non-integrated portable remote control garage door opening module. A control, responsive to the receiver wirelessly receiving signals generated by the portable garage door opening module, controls an accessory of the vehicle.

20 Claims, 2 Drawing Sheets

(56) References Cited

U.S. PATENT DOCUMENTS

| | | | |
|---|---|---|---|
| 7,962,260 B2* | 6/2011 | DiCroce | B60R 25/00 |
| | | | 701/36 |
| 8,421,591 B2 | 4/2013 | Karasek | |
| 8,508,831 B2 | 8/2013 | De Wind et al. | |
| 8,547,055 B2* | 10/2013 | MacK | B60W 10/28 |
| | | | 320/104 |
| 8,577,549 B2 | 11/2013 | Schofield et al. | |
| 8,779,910 B2 | 7/2014 | DeLine et al. | |
| 8,922,356 B2* | 12/2014 | Lambert | G07C 5/008 |
| | | | 340/426.1 |
| 10,416,665 B2* | 9/2019 | Park | G05D 1/0055 |
| 2002/0140289 A1 | 10/2002 | McConnell et al. | |
| 2004/0057131 A1 | 3/2004 | Hutzel et al. | |
| 2004/0239482 A1* | 12/2004 | Fitzgibbon | G08C 17/00 |
| | | | 340/5.61 |
| 2005/0134983 A1 | 6/2005 | Lynam | |
| 2005/0261816 A1* | 11/2005 | DiCroce | B60R 25/10 |
| | | | 701/36 |
| 2006/0202815 A1* | 9/2006 | John | G08B 21/14 |
| | | | 340/531 |
| 2007/0233342 A1* | 10/2007 | DiCroce | B60R 25/10 |
| | | | 701/36 |
| 2009/0096606 A1* | 4/2009 | Janov | G07C 9/00182 |
| | | | 340/540 |
| 2010/0134240 A1* | 6/2010 | Sims | G08C 17/02 |
| | | | 340/5.1 |
| 2011/0213512 A1* | 9/2011 | DiCroce | B60R 25/00 |
| | | | 701/2 |
| 2012/0143403 A1* | 6/2012 | Cho | B60R 1/12 |
| | | | 701/2 |
| 2014/0015976 A1 | 1/2014 | DeLine et al. | |
| 2014/0111320 A1* | 4/2014 | Holt | G07C 9/00309 |
| | | | 340/12.24 |
| 2014/0366105 A1* | 12/2014 | Bradley | H04W 12/06 |
| | | | 726/5 |
| 2015/0002262 A1* | 1/2015 | Geerlings | G07C 9/00309 |
| | | | 340/5.25 |
| 2015/0002310 A1* | 1/2015 | Guo | H04W 4/80 |
| | | | 340/901 |
| 2015/0264322 A1* | 9/2015 | Ang | H04N 5/2251 |
| | | | 348/143 |
| 2015/0302672 A1* | 10/2015 | Kalsi | G07C 3/00 |
| | | | 340/5.61 |
| 2015/0339031 A1* | 11/2015 | Zeinstra | G06F 3/04842 |
| | | | 715/747 |
| 2016/0352740 A1* | 12/2016 | Aronson | H04L 63/20 |
| 2017/0169636 A1* | 6/2017 | Piche | G07C 9/33 |
| 2017/0334500 A1* | 11/2017 | Jarek | G06F 3/16 |
| 2019/0011907 A1* | 1/2019 | Park | G05D 1/0055 |

* cited by examiner

VEHICLE ACCESSORY CONTROL SYSTEM RESPONSIVE TO A PORTABLE GDO MODULE

CROSS REFERENCE TO RELATED APPLICATION

The present application claims the filing benefits of U.S. provisional application Ser. No. 62/141,607, filed Apr. 1, 2015, which is hereby incorporated herein by reference in its entirety.

FIELD OF THE INVENTION

The present invention relates generally to the field of garage door openers for remotely opening garage doors via a wireless signal.

BACKGROUND OF THE INVENTION

It is known to use a portable remote control garage door opener to operate a garage door. For example, devices such as Chamberlain's Clicker® brand provide portable remote control of a garage door. These devices are typically battery operated and operate independently of vehicle electronics. It is also known to provide a mirror assembly that includes a garage door opener integrated therein. For example, the HOMELINK® system is integrated into the rearview mirror. Examples of such HOMELINK® integrated systems are described in U.S. Pat. Nos. 6,396,408; 6,172,613; 6,091,343; 5,854,593 and 5,708,415, which are hereby incorporated herein by reference in their entireties.

SUMMARY OF THE INVENTION

The present invention provides a vehicle-based system that, responsive to wirelessly receiving a signal from a portable remote garage door opener (separate from and not integrated in circuitry of the vehicle), controls an accessory, such as a display screen or audio speaker of the vehicle (such as at an instrument panel or at or in an interior rearview mirror assembly of the vehicle) that provides information pertaining to the garage door opener.

These and other objects, advantages, purposes and features of the present invention will become apparent upon review of the following specification in conjunction with the drawings.

DESCRIPTION OF THE PREFERRED EMBODIMENTS

Figure 1:
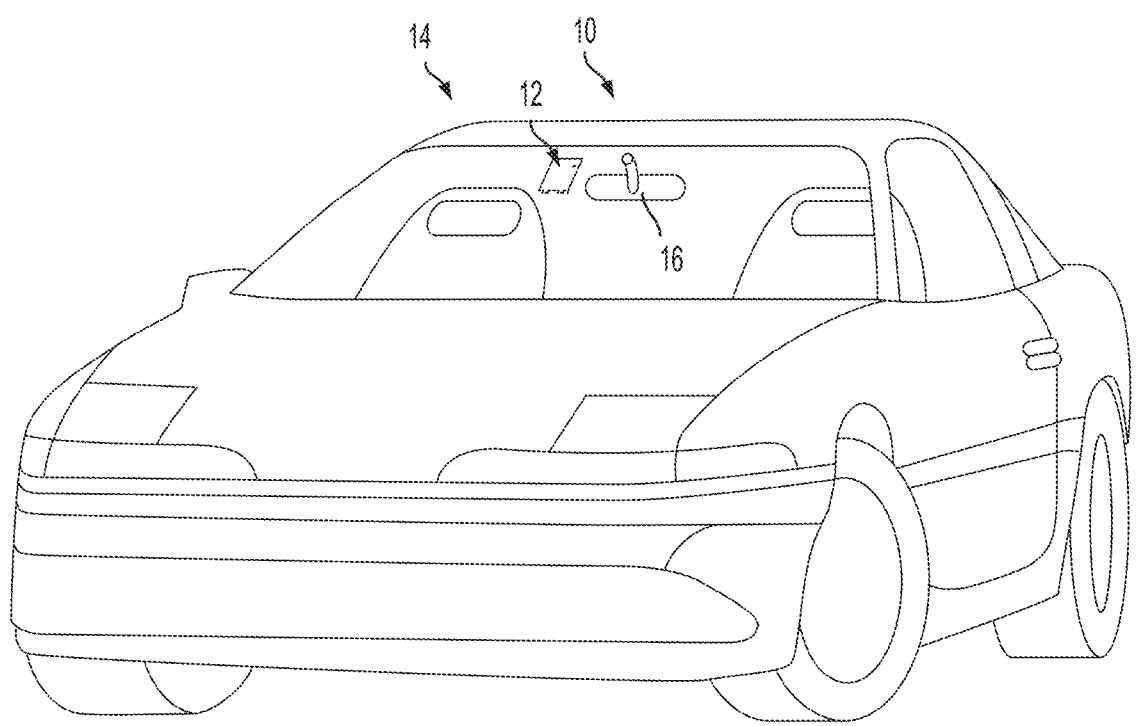
FIG. 1 is a perspective view of a vehicle having a system in accordance with the present invention.
Figure 2:
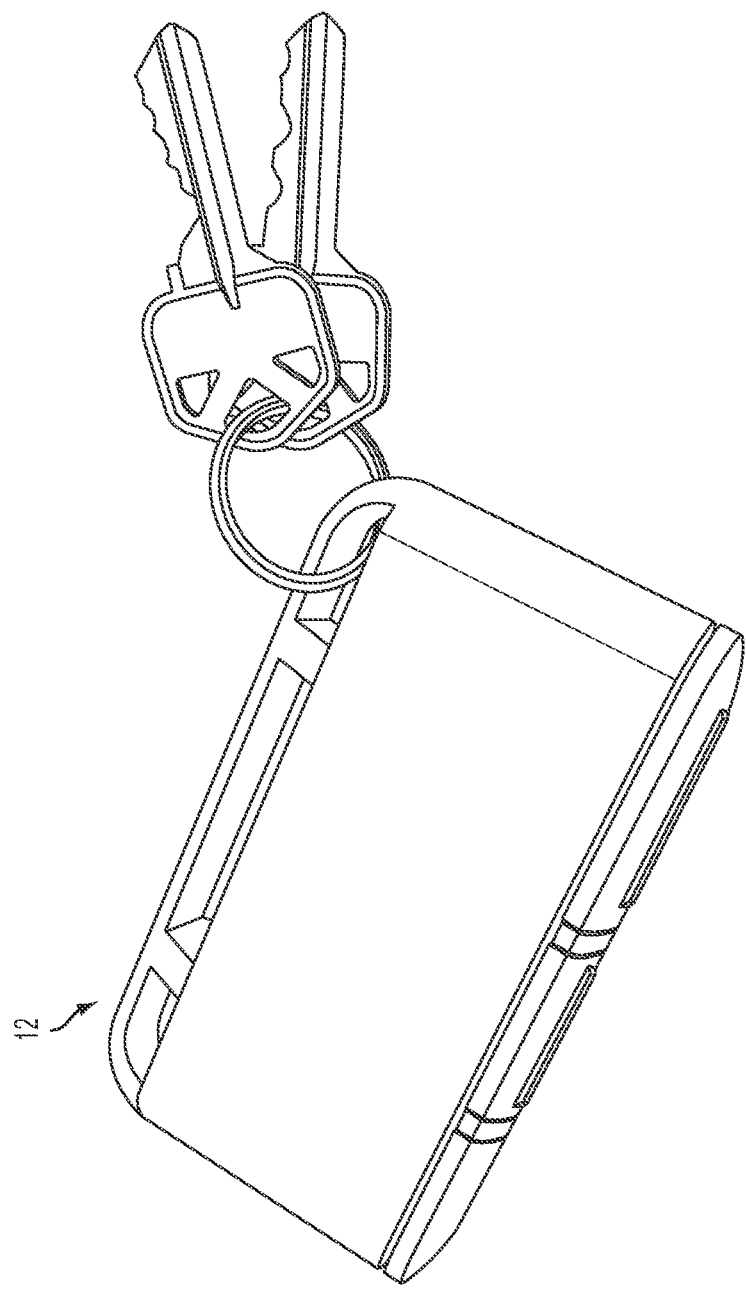
FIG. 2 is a perspective view of a remote garage door opening module that is suitable for use with the system of the present invention.

Referring now to the drawings and the illustrative embodiments depicted therein, a vehicle-based accessory control system 10 (comprising a receiver or antenna and a control) is operable to receive a signal from a portable garage door opening device or module 12, which comprises a separate module that is operable to control a garage door opener of a home or facility. The garage door opening device or module 12 is not integrated with circuitry or electronics of the vehicle 14, and when a button or the like of the garage door opening module is actuated, the module transmits a signal that is received by the garage door opener of the home or facility to open or close the garage door. Also, responsive to actuation of a button of the garage door opening module, a receiver of the accessory control system of the vehicle receives the signal and controls an accessory of the vehicle. The accessory may comprise an information display or an audio accessory that provides information to the user of the garage door opening module in the vehicle.

The portable garage door opening device or module comprises a self-contained portable module or unit that includes an integrated power source or battery and circuitry, such as control circuitry and a transmitter for transmitting a signal to a garage door opener at a garage. The portable remote control garage door opening device or module is separate from and not integrated with the vehicle electronics. The portable remote control garage door opening device or module (and the interior rearview mirror assembly of the vehicle) may utilize aspects of the modules (and mirrors) described in PCT Application No. PCT/US2015/050904, filed Sep. 18, 2015, which is hereby incorporated herein by reference in its entirety.

The portable remote control garage door opening device or module may comprise any suitable device or module that operates or controls or opens/closes a garage door. For example, devices such as Chamberlain's Clicker® brand provide portable remote control of a garage door. These devices or modules are battery operated and operate independently of vehicle electronics. Instructions as to how to program these units are also commonly available both with the purchase of a new garage door opener as well as online.

Contrary to the portable garage door opening module of the types suitable for operation with the control system of the present invention, the likes of HOMELINK® trainable garage door opening device (or other embedded, integrated accessory of the vehicle) often connects to a CAN system of the vehicle that is capable of receiving and/or sending data. For the likes of such an embedded garage door opening device, information on operation or success of operation or progress of operation can be communicated from the HOMELINK® integrated unit across the communication bus of the vehicle to a system of the vehicle, such as for display of information so that the user can receive information on the operation of the embedded device.

The present invention provides a system that works with a separate, non-integrated portable battery operated remote control garage door opening module, which is not wired into the vehicle and does not connect to the bus system of the vehicle. When actuated, such a portable module sends out a radio frequency (RF) signal or particular protocol or code for controlling the garage door opener at the home or facility. When the portable module is actuated, a receiver of the control system (that is disposed in the vehicle, such as at the interior rearview mirror assembly of the vehicle) detects or receives the signal and can determine that the module has been activated, and responsive to such detection, can control a vehicle accessory, such as to provide instructions or the like on, for example, how to program the subject portable remote GDO module to operate a particular garage door opener of a particular garage door of a particular home or facility. Thus, the vehicle-based system picks up the portable garage door opening module's signal and acts on it. The signal and receiver may comprise any suitable signals and receivers or communication links, and the signal may comprise a radio frequency (RF) wireless transmission or BLUETOOTH® communication link or any other suitable communication protocol. Thus, the vehicle has a receiver that receives the signal from the non-integrated portable device or module and acts on the received signal. When the portable module is removed from the vehicle and carried a threshold distance (such as about 30 feet or the like) from the vehicle, the vehicle receiver and system would not receive the signal from the portable module. Optionally, the remote control portable garage door opening module may include a receiver to receive signals from a transmitter of the vehicle so as to provide a wireless bridge between the module and the vehicle.

The present invention provides a system that, responsive to the separate portable garage door opening module being actuated by a user, controls an accessory of the vehicle, such as a display device or an audio system of the vehicle to provide appropriate information to the user of the portable garage door opening module. For example, in order to assist a consumer with the instructions of the portable garage door opening module and/or garage door opener, the system may incorporate the instructions into the vehicle itself, whereby, responsive to actuation of the separate portable remote control garage door opening module, the system may display the instructions to facilitate programming of the garage door opener or the like. In addition, the system may generate a display or audible signal to provide feedback in the vehicle when certain programming steps are completed.

The system of the present invention thus comprises incorporation within the equipped vehicle of an appropriate RF antenna inside of an electronic component of the vehicle that communicates with the data bus or communication bus (such as a CAN bus or the like) of the vehicle, which allows the vehicle-based system to recognize the actuation of the button of the portable remote control garage door opening module, even though there is no physical electrical connection. Optionally, the electronic component may be part of an interior rearview mirror assembly 16 of the vehicle.

By providing this wireless connection between the vehicle and the portable remote control garage door opening module or unit, many possibilities are provided by the system of the present invention. For example, responsive to actuation of a button of the separate portable remote control module, instructions similar to the ones available online or the ones sold with the garage door opener can displayed by the vehicle display anywhere in the vehicle (such as a display screen incorporated at an instrument panel or console or interior rearview mirror assembly of the equipped vehicle). Optionally, responsive to actuation of the button of the separate portable remote control module, the instructions can also or otherwise be audibly broadcast over the vehicle audio system.

The wireless connection to a vehicle system can also bridge a connection of the portable remote garage door opener to a synchronized smart phone as well as many other possibilities. All of these allow the vehicle to confirm the actuation of remote garage door opening module's buttons, which allows the instructions to advance to the next step automatically.

Optionally, the portable garage door opening module may be received into a receiving portion of the mirror assembly that is established at a side or upper region of the mirror casing. Optionally, the receiving portion of the mirror assembly may comprise a pocket or recess established at a rear portion of the mirror casing (such as at a recess established at the rear of a mirror casing of the types described in U.S. Pat. No. 8,508,831, which is hereby incorporated herein by reference in its entirety), whereby the module may be substantially exposed at the pocket at the rear of the mirror casing. Optionally, the garage door opening module of the present invention may be configured to attach elsewhere, such as at the mounting portion or base of the mirror assembly, or at a windshield electronics module or accessory module at or near or remote from the interior rearview mirror assembly. Optionally, the garage door opening module may be configured to attach elsewhere remote from the interior rearview mirror assembly and windshield, such as at a sun visor or header or console of the vehicle or the like.

The garage door opening module may include one or more buttons or user inputs for actuating or controlling circuitry of the module. Optionally, the module may include an indicator (such as a light emitting diode (LED) or the like) that is actuatable responsive to a user pressing one or more of the buttons of the module to indicate to the user that the module has been actuated (for example, to indicate that the module is transmitting its signal to a garage door opener at a garage or to indicate that the module is learning a signal code or has learned a signal code for an associated garage door opener, and optionally the module may include a plurality of indicators or LEDs that are individually and/or cooperatively actuatable to indicate respective functions).

Thus, the garage door opening module of the present invention is battery powered, such as lithium battery powered, with the battery integrated in the module. The circuitry of the module is operable by or powered by the integrated battery and operable to transmit one or more signals responsive to actuation of one or more of the user inputs or buttons of the garage door opening module. The garage door opening module may be separately obtainable separate from the vehicle and/or mirror assembly as a self-contained unit or module. Preferably, a lithium ion battery is used and the circuitry utilized is designed to minimize power and current utilization or consumption, so that the lithium ion battery need not be replaceable but can power the garage door opening module throughout utilization during the ten years or more life cycle of a vehicle. Operation of the garage door opening module is of course only during a desired garage door opening event and so use of the module is intermittent/sporadic and infrequent (such as, for example, only about two to four times a day or thereabouts), and only then the module operates for a very short period of time (such as a second or so when actuated to open or close the garage door). Thus, the garage door opening module of the present invention can be made compact with a lithium ion battery.

Optionally, the garage door opening module may be trainable or universal garage door opening device such as utilizing known circuitry and protocols, or the garage door opening module may operate in accordance with or may be associated with a MyQ® garage door opening system or protocol commercially available from The Chamberlain Group, Inc. of Elmhurst, Ill. For example, the garage door opening module may operate in a system utilizing aspects of the systems described in U.S. Pat. Nos. 6,998,977 and/or 8,421,591, which are hereby incorporated herein by reference in their entireties. Optionally, the garage door opening module may utilize aspects of the vehicle based garage door opening systems described in U.S. Pat. Nos. 8,779,910; 8,577,549; 6,396,408; 6,362,771; 7,023,322 and/or 5,798, 688, which are hereby incorporated herein by reference in their entireties.

When the garage door opening module of the present invention is used with a MyQ® or similar system, an internet gateway is utilized wherein the garage door opening module is in communication with the likes of a smart phone carried into the vehicle by an occupant (such as the driver or a passenger). The garage door opening module wirelessly communicates with such a smart phone or the like and the driver of the equipped vehicle may submit input (such as voice input or touch input or other user input) via the smart phone to the garage door opening module. The garage door opening module then wirelessly communicates or links with a MyQ® home module or unit located remotely from the vehicle, such as at the house or home of the driver where the subject garage door opener (that is to be remotely operated via the garage door opening module of the present invention) is located. Commands and/or information are thus wirelessly communicated (preferably via the internet/world wide web) to the remote-located MyQ® house/home module. Correspondingly, data as to the status (opened or closed) of the likes of the subject garage door at the subject house/home may be communicated from the house/home to the equipped vehicle via the internet/world wide web. Such a smart phone (or equivalent device) internet-gateway garage door opening system may be incorporated by the likes of Ford Motor Company into its SYNC® communication system. Alternatively, or in addition to smart phone utilization in the garage door opening system of the present invention, the likes of General Motors' ONSTAR® may incorporate the likes of a MyQ® garage door opener communication into the vehicle, with a garage door opening module (associated with the MyQ® system) preferably included in (and removable/detachable from) the interior rearview mirror assembly as described herein.

In accordance with the present invention, the garage door opening module is self-contained—all mechanical and electrical parts needed for operation are contained/packaged in a single unit. Thus, the battery, any user-operable buttons, the circuitry, antennae, casing and the like are provided in a unitary module or package. Thus, the owner of a vehicle equipped with the self-contained, battery-operated, portable, non-integrated garage door opening module of the present invention can, for example, remove the self-contained, battery-operated, portable, non-integrated garage door opening module from the vehicle when leaving the vehicle and may use the garage door opening module outside the vehicle or mount it into another vehicle (or replace the current garage door opening module with another updated garage door opening module). This portability is not possible with the known HOMELINK® system, where the garage door opening device is an integral part of likes of an interior mirror assembly or a visor and is not removable therefrom as a self-contained, portable unit. Thus, for example, if an owner of a vehicle equipped with a HOMELINK® system sells or scraps that vehicle, the HOMELINK® garage door opening device (being integrated into the vehicle) is sold with and goes with the vehicle.

The portability of the garage door opening module of the present invention has further advantages. The buyer of a vehicle can buy a garage door opening module from a store (such as a Menards store or a Target store or a Home Depot or a Lowes or the like) or buy the garage door opening module online from the likes of Amazon, and the owner of the vehicle can himself/herself install the garage door opening module into the vehicle (such as at or in an interior rearview mirror assembly of the vehicle that is configured to receive that self-contained, battery-operated, portable garage door opening module). By not being integrated into the vehicle, the consumer can choose the best price and place to buy the garage door opening module, a distinct advantage over the integrated HOMELINK® systems currently used in vehicles where the HOMELINK® unit is not portable and where the consumer needs to buy the HOMELINK® feature when buying the subject vehicle, and thus must pay the price demanded by the OEM dealership (such as a Ford dealership or a GM dealership or a Toyota dealership) to buy the subject vehicle equipped with the HOMELINK® option.

A self-contained, battery-operated, portable garage door opening module suitable for use in the present invention is the Chamberlain 953EV Garage Door Opener Remote available from The Chamberlain Group Inc. of Elmhurst, Ill. The Chamberlain 953EV Garage Door Opener is for use with 315 MHz or 390 MHz garage door openers manufactured after Jan. 1, 1993. The battery-operated Chamberlain 953EV garage door opener activates when the programmed button in the remote control is pressed. The remote control can activate up to three garage door openers. Other self-contained, battery-operated, portable garage door opening modules are available from Chamberlain, such as Universal Clicker® Products. Chamberlain universal clicker garage door opener products are designed to work with a variety of garage door opener brands to give convenient, secure access to a garage or a home. They work with a variety of garage door opener models and frequencies. For example, the Clicker® Universal Remote Control Model KLIK1U (that can operate up to two different brands and/or frequencies of garage door openers) is a self-contained, battery-operated, portable garage door opening module suitable to use in the present invention.

The self-contained, battery-operated, portable garage door opening module of the present invention may comprise a speaker/microphone module that allows hands-free communication (preferably using voice activation and control) with a phone or other device within the cabin of the equipped vehicle, such as via use of a Bluetooth short-range RF communication protocol.

The inclusion of a portable garage door opening module of the present invention can utilize and benefit from constructions disclosed in U.S. Pat. Nos. 7,293,888; 7,012,727; 6,902,284 and 6,428,172 (which are hereby incorporated herein by reference in their entireties).

The mirror reflective element may comprise any suitable reflective element, such as an electro-optic (such as electrochromic) reflective element or a prismatic reflective element. The mirror casing may include a bezel portion that circumscribes a perimeter region of the front surface of the reflective element or the reflective element may comprise a frameless reflective element, such as a frameless reflective element utilizing aspects of the reflective elements described in U.S. Pat. No. 8,508,831 and/or International Publication Nos. WO 2010/124064, WO 2011/044312, WO 2012/051500 and/or WO 2013/071070, which are hereby incorporated herein by reference in their entireties. For example, and such as can be seen with reference to FIG. 7, the mirror reflective element may comprise a glass substrate having a perimeter edge, with the perimeter edge of the glass substrate being exposed to and viewable by the driver of the vehicle when the interior rearview mirror assembly is normally mounted in the vehicle, and with the perimeter edge of said glass substrate comprising a curved surface disposed between a front surface of the glass substrate and the mirror casing.

Optionally, for example, the reflective element may comprise a laminate construction variable reflectance electro-optic (such as electrochromic) reflective element assembly having a front substrate and a rear substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties.

Optionally, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; 7,657,052 and/or 6,678,614, and/or U.S. Publication No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or U.S. Publication Nos. US-2006-0061008; US-2006-0050018; US-2009-0015736; US-2009-0015736 and/or US-2010-0097469, and/or PCT Application No. PCT/US10/47256, filed Aug. 31, 2010, which are all hereby incorporated herein by reference in their entireties. The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, a voice recorder, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like), a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

The mirror assembly may comprise or utilize aspects of other types of casings or the like, such as described in U.S. Pat. Nos. 7,289,037; 6,439,755; 4,826,289 and/or 6,501,387, which are all hereby incorporated herein by reference in their entireties, without affecting the scope of the present invention. Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A control system of a vehicle, said control system comprising:

a portable garage door opening module, wherein the portable garage door opening module comprises a power source, circuitry, a user input and a transmitter for wirelessly transmitting signals upon actuation of the user input;

wherein the portable garage door opening module, when the user input is actuated, and whether disposed in the vehicle or disposed exterior and remote from the vehicle, wirelessly transmits a garage door opener signal, and wherein that garage door opener signal, as transmitted by the portable garage door opening module, is received by a garage door opener receiver of a garage door opener of a garage of a house;

a vehicle-based receiver disposed in the vehicle and operable to receive signals wirelessly transmitted by the portable garage door opening module when the user input of the portable garage door opening module is actuated; and a control disposed in the vehicle, wherein said control, responsive to said vehicle-based receiver receiving signals wirelessly transmitted by the portable garage door opening module upon actuation of the user input, controls an accessory of the vehicle.

2. The control system of claim 1, wherein said vehicle-based receiver is incorporated in an interior rearview mirror assembly of the vehicle.

3. The control system of claim 2, wherein said interior rearview mirror assembly is configured to removably support the portable garage door opening module at said interior rearview mirror assembly when the portable garage door opening module is disposed in the vehicle.

4. The control system of claim 2, wherein said accessory is disposed at the interior rearview mirror assembly of the vehicle.

5. The control system of claim 1, wherein said accessory comprises a display screen of the vehicle.

6. The control system of claim 5, wherein said control, responsive to said vehicle-based receiver receiving signals wirelessly transmitted by the portable garage door opening module upon actuation of the user input, controls said display screen to display information pertaining to at least one of (i) operation of the portable garage door opening module, (ii) success of operation of the portable garage door opening module and (iii) progress of operation of the portable garage door opening module.

7. The control system of claim 5, wherein said control, responsive to said vehicle-based receiver receiving signals wirelessly transmitted by the portable garage door opening module upon actuation of the user input, controls said display screen to display instructions pertaining to operation of the portable garage door opening module.

8. The control system of claim 1, wherein said accessory comprises an audio speaker of the vehicle.

9. The control system of claim 8, wherein said control, responsive to said vehicle-based receiver receiving signals wirelessly transmitted by the portable garage door opening module upon actuation of the user input, controls said audio speaker to generate audible signals pertaining to at least one of (i) operation of the portable garage door opening module, (ii) success of operation of the portable garage door opening module and (iii) progress of operation of the portable garage door opening module.

10. The control system of claim 8, wherein said control, responsive to said vehicle-based receiver receiving signals wirelessly transmitted by the portable garage door opening module upon actuation of the user input, controls said audio speaker to generate audible signals pertaining to operation of the portable garage door opening module.

11. The control system of claim 1, wherein said control controls said accessory of the vehicle via a bus system of the vehicle.

12. The control system of claim 1, wherein said control controls said accessory of the vehicle via a CAN bus system of the vehicle.

13. A control system of a vehicle, said control system comprising:
- a portable garage door opening module, wherein the portable garage door opening module comprises a power source, circuitry, a user input and a transmitter for wirelessly transmitting signals upon actuation of the user input;
- wherein the portable garage door opening module, when the user input is actuated, and whether disposed in the vehicle or disposed exterior and remote from the vehicle, wirelessly transmits a garage door opener signal, and wherein that garage door opener signal, as transmitted by the portable garage door opening module, is received by a garage door opener receiver of a garage door opener of a garage of a house;
- a vehicle-based receiver disposed in the vehicle and operable to receive signals wirelessly transmitted by the portable garage door opening module when the user input of the portable garage door opening module is actuated;
- a control disposed in the vehicle, wherein said control, responsive to said vehicle-based receiver receiving signals wirelessly transmitted by the portable garage door opening module upon actuation of the user input, controls an accessory of the vehicle;
- wherein said accessory comprises a display screen of the vehicle; and
- wherein said control, responsive to said vehicle-based receiver receiving signals wirelessly transmitted by the portable garage door opening module upon actuation of the user input, controls said display screen to display information pertaining to operation of the portable garage door opening module.

14. The control system of claim 13, wherein said vehicle-based receiver is incorporated in an interior rearview mirror assembly of the vehicle.

15. The control system of claim 14, wherein said interior rearview mirror assembly is configured to removably support the portable garage door opening module at said interior rearview mirror assembly when the portable garage door opening module is disposed in the vehicle.

16. The control system of claim 13, wherein said control, responsive to said vehicle-based receiver receiving signals wirelessly transmitted by the portable garage door opening module upon actuation of the user input, controls said display screen to display information pertaining to at least one of (i) success of operation of the portable garage door opening module and (ii) progress of operation of the portable garage door opening module.

17. The control system of claim 13, wherein said control controls said accessory of the vehicle via a bus system of the vehicle.

18. A control system of a vehicle, said control system comprising:
- a portable garage door opening module, wherein the portable garage door opening module comprises a power source, circuitry, a user input and a transmitter for wirelessly transmitting signals upon actuation of the user input;
- wherein the portable garage door opening module, when the user input is actuated, and whether disposed in the vehicle or disposed exterior and remote from the vehicle, wirelessly transmits a garage door opener signal, and wherein that garage door opener signal, as transmitted by the portable garage door opening module, is received by a garage door opener receiver of a garage door opener of a garage of a house;
- a vehicle-based receiver disposed in the vehicle and operable to receive signals wirelessly transmitted by the portable garage door opening module when the user input of the portable garage door opening module is actuated;
- an interior rearview mirror assembly configured to removably support the portable garage door opening module at said interior rearview mirror assembly when the portable garage door opening module is disposed in the vehicle;
- a control disposed in the vehicle, wherein said control, responsive to said vehicle-based receiver receiving signals wirelessly transmitted by the portable garage door opening module upon actuation of the user input, controls an accessory of the vehicle;
- wherein said vehicle-based receiver is incorporated in said interior rearview mirror assembly of the vehicle; and
- wherein said control controls said accessory of the vehicle via a bus system of the vehicle.

19. The control system of claim 18, wherein said accessory comprises a display screen of the vehicle, and wherein said control, responsive to said vehicle-based receiver receiving signals wirelessly transmitted by the portable garage door opening module upon actuation of the user input, controls said display screen to display instructions pertaining to operation of the portable garage door opening module, and wherein said control, responsive to said vehicle-based receiver receiving signals wirelessly transmitted by the portable garage door opening module upon actuation of the user input, controls said display screen to display information pertaining to at least one of (i) operation of the portable garage door opening module, (ii) success of operation of the portable garage door opening module and (iii) progress of operation of the portable garage door opening module.

20. The control system of claim 18, wherein said accessory comprises an audio speaker of the vehicle, and wherein said control, responsive to said vehicle-based receiver receiving signals wirelessly transmitted by the portable garage door opening module upon actuation of the user input, controls said audio speaker to generate audible signals pertaining to operation of the portable garage door opening module, and wherein said control, responsive to said vehicle-based receiver receiving signals wirelessly transmitted by the portable garage door opening module upon actuation of the user input, controls said audio speaker to generate audible signals pertaining to at least one of (i) operation of the portable garage door opening module, (ii) success of operation of the portable garage door opening module and (iii) progress of operation of the portable garage door opening module.

* * * * *